United States Patent
Bandopadhyay et al.

(10) Patent No.: US 8,224,935 B1
(45) Date of Patent: Jul. 17, 2012

(54) SYSTEMS AND METHODS FOR EFFICIENTLY SYNCHRONIZING CONFIGURATION DATA WITHIN DISTRIBUTED COMPUTING SYSTEMS

(75) Inventors: Tushar Bandopadhyay, San Jose, CA (US); Sachin Vaidya, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 170 days.

(21) Appl. No.: 12/778,796

(22) Filed: May 12, 2010

(51) Int. Cl.
*G06F 15/177* (2006.01)

(52) U.S. Cl. ........ 709/221; 709/248; 709/228; 709/203; 707/698; 370/256

(58) Field of Classification Search .................. 709/203, 709/221, 229, 248; 707/698; 370/256
See application file for complete search history.

(56) References Cited

U.S. PATENT DOCUMENTS

| 7,386,532 | B2 * | 6/2008 | Kiessig et al. ........................ 1/1 |
| 7,404,006 | B1 * | 7/2008 | Slaughter et al. ............. 709/238 |
| 7,870,103 | B1 * | 1/2011 | Maheshwari et al. ........ 707/687 |
| 2008/0109395 | A1 * | 5/2008 | Loeb ................................ 707/1 |
| 2010/0110935 | A1 * | 5/2010 | Tamassia et al. ............. 370/256 |
| 2010/0257149 | A1 * | 10/2010 | Cognigni et al. ............. 707/698 |

* cited by examiner

*Primary Examiner* — Phuoc Nguyen
*Assistant Examiner* — June Sison
(74) *Attorney, Agent, or Firm* — Advantedge Law Group (57) ABSTRACT

A method for efficiently synchronizing configuration data within distributed computing systems may include: 1) maintaining a hash tree that is based on the hierarchical relationship of each object within a distributed computing system that is relevant to the computing device, 2) determining, during a reconciliation process with an additional computing device, that a hash of a top-level node of the hash tree differs from a hash of a corresponding node of the additional computing device's hash tree, 3) identifying, by iterating through the hash levels of the computing device's hash tree, at least one leaf node within the computing device's hash tree whose hash differs from a hash of a corresponding leaf node within the additional computing device's hash tree, 4) receiving the changed leaf node's value from the additional computing device, and then 5) updating the identified leaf node's value to match the changed leaf node's value.

20 Claims, 7 Drawing Sheets

SYSTEMS AND METHODS FOR EFFICIENTLY SYNCHRONIZING CONFIGURATION DATA WITHIN DISTRIBUTED COMPUTING SYSTEMS

BACKGROUND

Devices within a distributed computing environment must typically exchange large amounts of configuration data in order to identify and access various distributed resources. For example, a central server within a client-server computing model may be required to distribute a large amount of configuration data to each client within its distributed computing environment in order to enable these clients to identify and access the distributed resources they require to perform various tasks. Similarly, a peer within a peer-to-peer computing model may request a large amount of configuration data from one or more of its peers in order to identify and access the distributed resources the peer requires to perform various tasks.

A distributed computing system's configuration data is typically represented in the form of a tree that identifies the hierarchical relationship of each object within the distributed computing system. Nodes within this tree may represent objects (such as a cluster, system, group, application, resource, or attribute of the same) within the distributed computing system connected in parent-child relationships. Devices within the distributed computing system may be interested in either the entire tree (e.g., peers within a peer-to-peer model or a server within a client-server model may be interested in the entire tree) or a subset of the tree (e.g., clients within a client-server model may only be interested in a subset of the tree).

Unfortunately, due to the typical size of this configuration data, an inordinate amount of network bandwidth may be required to exchange even a subset of this configuration data among devices within the distributed computing system, resulting in potential delays. For example, the amount of time required for a client to recover from a failure may be dramatically increased due to the time required to request, receive, and process a snapshot of (even a subset of) a central server's configuration data. As such, the instant disclosure identifies a need for systems and methods for efficiently synchronizing configuration data within distributed computing systems.

SUMMARY

As will be described in greater detail below, the instant disclosure generally relates to systems and methods for efficiently synchronizing configuration data within distributed computing systems. In one example, an exemplary computing device (such as a client within a client-server model or a peer within a peer-to-peer model) may accomplish such a task by: 1) maintaining a hash tree that is based on the hierarchical relationship of each object within the distributed computing system that is relevant to the computing device, 2) determining, during a reconciliation process with an additional computing device (such as a server or peer) within the distributed computing system, that the hash of a top-level node within the computing device's hash tree differs from the hash of a corresponding node of a hash tree maintained by the additional computing device, 3) identifying, by iterating through the hash levels of the computing device's hash tree, at least one leaf node within the computing device's hash tree whose hash differs from the hash of a corresponding leaf node within the additional computing device's hash tree, 4) receiving the changed leaf node's value from the additional computing device (e.g., as a part of a snapshot of a subset of the additional computing device's configuration data), and then 5) updating the identified leaf node's value to match the changed leaf node's value.

In some examples, the computing device's hash tree may include, for each leaf node within the hash tree, a hash of the leaf node's value and, for each non-leaf node within the hash tree, a hash of the concatenated hashes of all of the non-leaf node's children. If the computing device determines that the value of a leaf node within the computing device's hash tree has changed, the computing device may: 1) recalculate the changed leaf node's hash and then 2) iteratively recalculate the hash of each ancestor of the changed leaf node until the hash of the top-level node has been recalculated.

In one example, the computing device may generate or calculate each hash within its hash tree using the same hash function. For example, the computing device may calculate each hash within its hash tree using an SHA-1 hash function. Similarly, in some examples the computing device may generate or calculate hashes for its hash tree using the same hash function that is used by all other computing devices within the distributed computing system. For example, all computing devices within the distributed computing system may use an SHA-2 hash function when generating or calculating hashes.

In some examples, the computing device may attempt to avoid confusion that may result from the deletion of a node within the distributed computing system's hierarchy by accounting for and flagging deleted nodes. For example, if a server removes one or more nodes from its hash tree, then the server may mark or flag such nodes within its hash tree as having been deleted (by, e.g., replacing the hash value of each deleted node with a predetermined value, such as "−1," that indicates that the node has been deleted). In this example, when a client subsequently requests and compares hashes within its hash tree with corresponding hashes of the server's hash tree, then the client may identify nodes that have been flagged or marked for deletion and remove the same from its hash tree. In some examples, the computing device may periodically purge or remove all nodes that have been flagged or marked as deleted.

In one example, the computing device may attempt to reduce the probability of hash collisions by using a hash-collision-detection function (such as a Bloom filter) to identify potential hash collisions. If the computing device identifies a potential hash collision, then the computing device may modify the hash of a problematic node implicated in the potential hash collision by, for example: 1) creating a null child node for the problematic node and then 2) recalculating the problematic node's hash. The computing device may also attempt to reduce the probability of hash collisions by using differing hash functions when calculating leaf-node hashes and non-leaf-node hashes.

As will be explained in greater detail below, by building and maintaining a hash tree that is based on the hierarchical relationship of each relevant object within a distributed computing system, the systems and methods described herein may enable devices within the distributed computing system to quickly and efficiently identify configuration-data changes during a reconciliation process. In addition, by identifying and exchanging such changes, these systems and methods may enable devices within the distributed computing system to reduce the amount of data exchanged during reconciliation, potentially saving time and resources.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for efficiently synchronizing configuration data within distributed computing systems. The term "distributed computing system," as used herein, may refer to a computing system that includes a plurality of autonomous computing devices that interact with each other in order to achieve a common goal. Similarly, the term "configuration data" may refer to any type or form of data that may be required by one or more devices within the distributed computing system to accomplish such a task.

Figure 1:
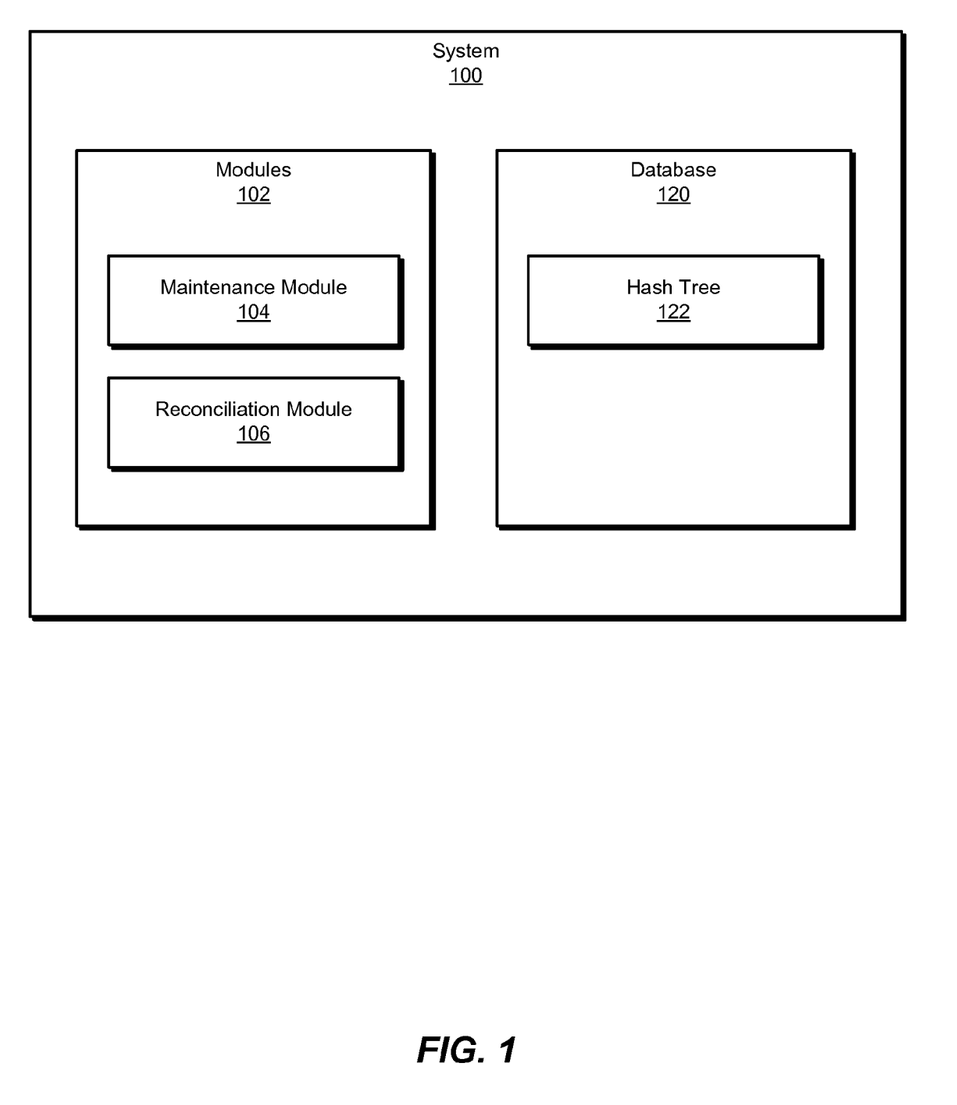
FIG. 1 is a block diagram of an exemplary system for efficiently synchronizing configuration data within distributed computing systems.
Figure 2:
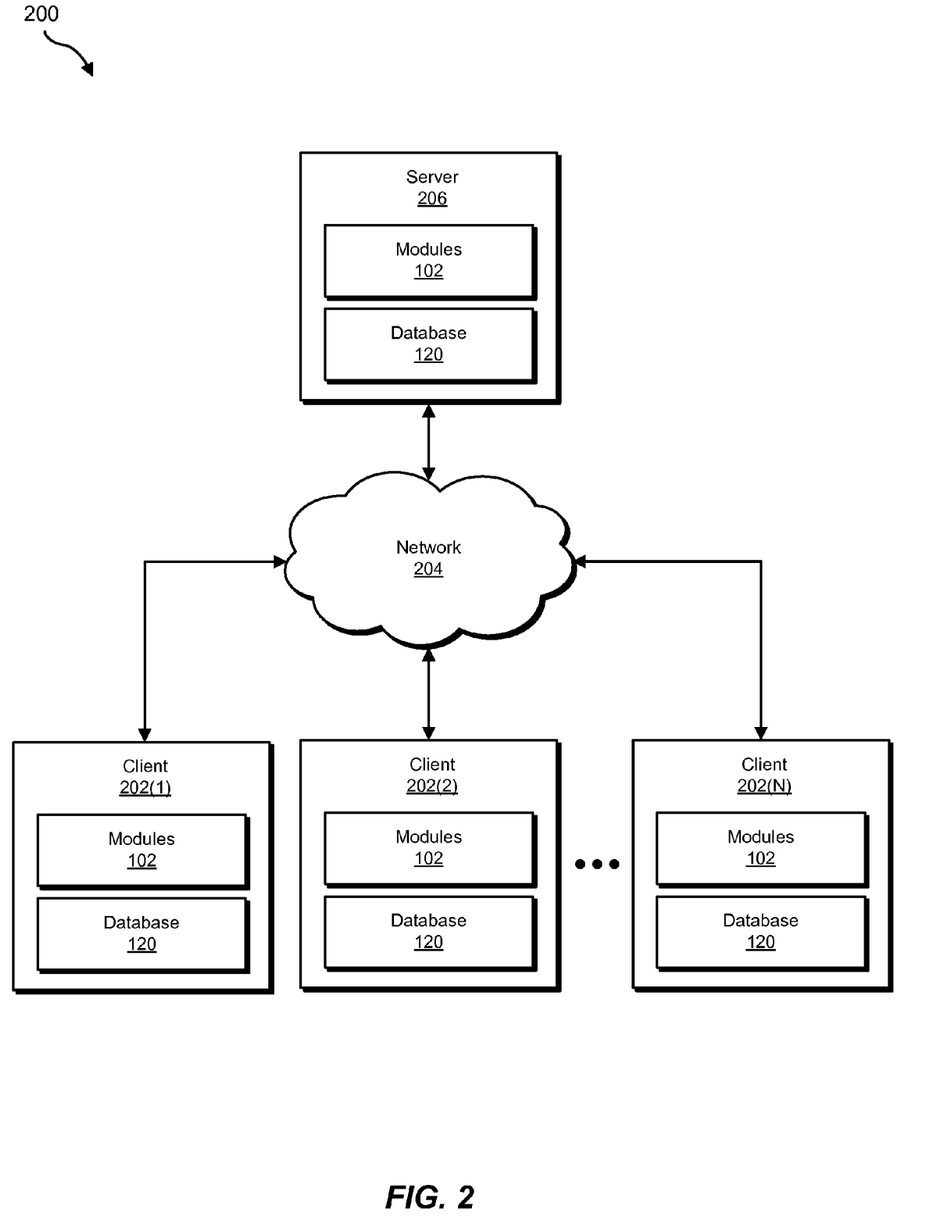
FIG. 2 is a block diagram of an exemplary system for efficiently synchronizing configuration data within distributed computing systems.
Figure 3:
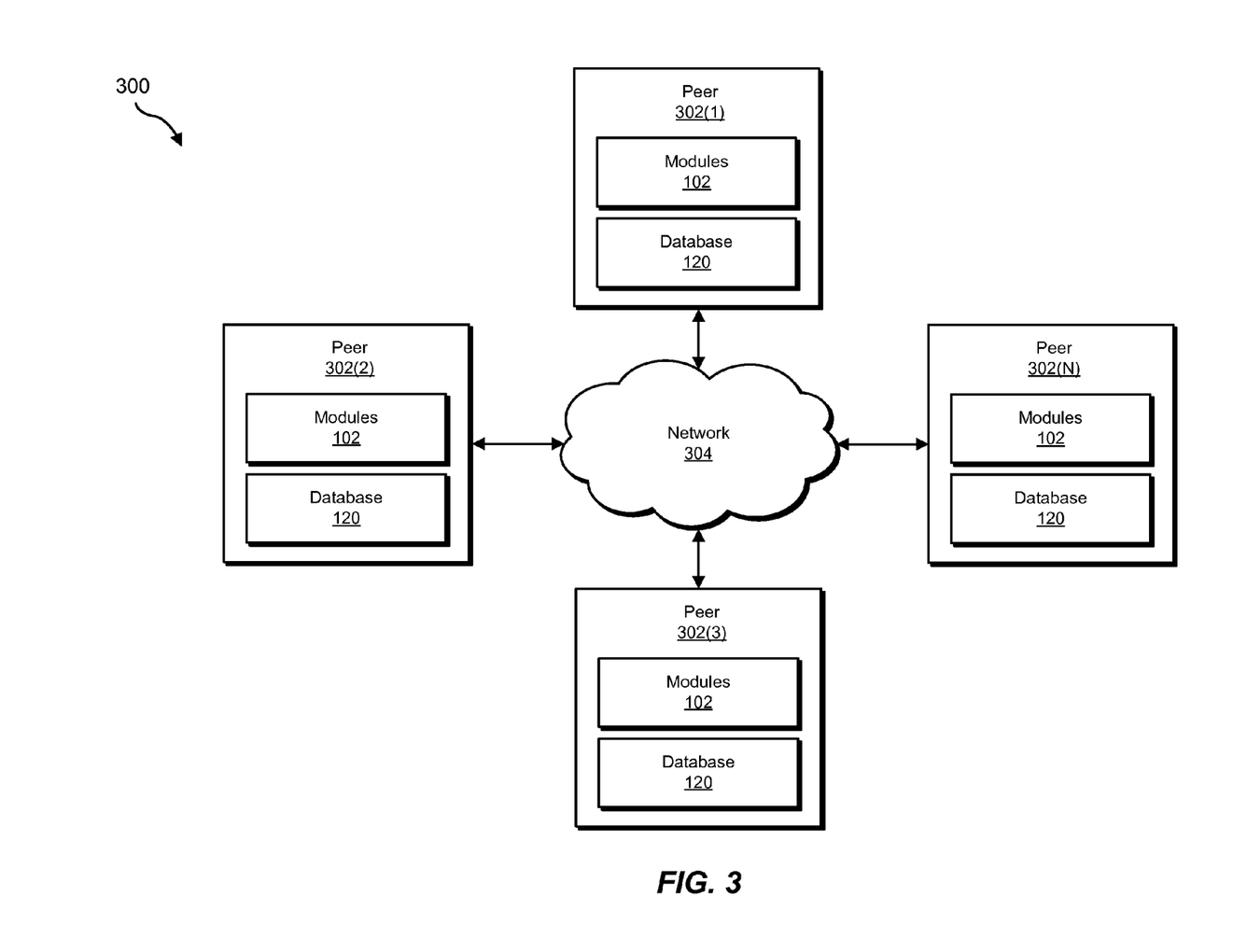
FIG. 3 is a block diagram of an additional exemplary system for efficiently synchronizing configuration data within distributed computing systems.

The following will provide, with reference to FIGS. 1-3, detailed descriptions of exemplary systems for efficiently synchronizing configuration data within distributed computing systems. Detailed descriptions of corresponding computer-implemented methods will also be provided in connection with FIGS. 4-5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for efficiently synchronizing configuration data within distributed computing systems. As illustrated in this figure, exemplary system 100 may include one or more modules 102 for performing one or more tasks. For example, and as will be explained in greater detail below, exemplary system 100 may include a maintenance module 104 programmed to build and maintain a hash tree (such as hash tree 122) that is based on the hierarchical relationship of each object within a distributed computing system that is relevant to system 100. Exemplary system 100 may also include reconciliation module 106 programmed to use the hash tree to efficiently synchronize configuration data with an additional computing device within the distributed computing system during a reconciliation process. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIGS. 2 and 3 (e.g., clients 202 (1)-(N), server 306, and/or peers 302(1)-(N)), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may include a hash tree 122. As will be described in greater detail below, hash tree 122 may be based on and/or identify the hierarchical relationship of each object within a distributed computing system that is relevant to system 100. Database 120 may represent portions of a single database or computing device or a plurality of databases or computing devices. For example, database 120 may represent a portion of one or more of the devices illustrated in FIGS. 2 and 3, computing system 610 in FIG. 6, and/or portions of exemplary network architecture 700 in FIG. 7. Alternatively, database 120 in FIG. 1 may represent one or more physically separate devices capable of being accessed by a computing device, such as the devices illustrated in FIGS. 2 and 3, computing system 610 in FIG. 6, and/or portions of exemplary network architecture 700 in FIG. 7.

Exemplary system 100 in FIG. 1 may be deployed in a variety of ways. For example, all or a portion of exemplary system 100 may represent portions of a distributed computing system, such as exemplary distributed computing 200 in FIG. 2 and/or exemplary distributed computing system 300 in FIG. 3. Exemplary system 100 may also represent portions of any other type or form of computing system that includes a plurality of autonomous computing devices that interact with each other in order to achieve a common goal.

As shown in FIG. 2, distributed computing system 200 may include one or more clients 202(1)-(N) in communication with a server 206 via a network 204. In one embodiment, and as will be described in greater detail below, modules 102 may program one or more of these devices to perform a variety of tasks. For example, modules 102 may program client 202(1) to: 1) maintain a hash tree (such as hash tree 122 in FIGS. 1 and 5) that is based on the hierarchical relationship of each object within distributed computing system 200 that is relevant to client 202(1), 2) determine, during a reconciliation process with server 206, that the hash of a top-level node within its hash tree differs from the hash of a corresponding node of a hash tree maintained by server 206, 3) identify, by iterating through the hash levels of its hash tree, at least one leaf node within its hash tree whose hash differs from the hash of a corresponding leaf node within the hash tree maintained by server 206, 4) receive the changed leaf node's value from server 206 (e.g., as a part of a snapshot of a subset of the configuration data maintained by server 206), and then 5) update the identified leaf node's value to match the changed leaf node's value.

Clients 202(1)-(N) generally represent any type or form of computing device capable of reading computer-executable instructions. Examples of clients 202(1)-(N) include, without limitation, laptops, desktops, servers, cellular phones, personal digital assistants (PDAs), multimedia players, embedded systems, combinations of one or more of the same, exemplary computing system 610 in FIG. 6, or any other suitable computing device.

Server 206 generally represents any type or form of computing device that is capable of maintaining configuration data for devices within a distributed computing system. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 700 in FIG. 7, or the like. Network 204 may facilitate communication or data transfer using wireless or wired connections. In one embodiment, network 204 may facilitate communication between clients 202(1)-(N) and server 206.

As shown in FIG. 3, distributed computing system 300 may include a plurality of peers 302(1)-(N) in communication with one another via a network 304. In one embodiment, and as will be described in greater detail below, modules 102 may program one or more of these devices to perform a variety of tasks. For example, modules 102 may program peer 302(1) to: 1) maintain a hash tree (such as hash tree 122 in FIGS. 1 and 5) that is based on the hierarchical relationship of each object within distributed computing system 300 that is relevant to peer 302(1), 2) determine, during a reconciliation process with another peer (such as peer 302(2)), that the hash of a top-level node within its hash tree differs from the hash of a top-level node of a hash tree maintained by the other peer, 3) identify, by iterating through the hash levels of its hash tree, at least one leaf node within its hash tree whose hash differs from the hash of a corresponding leaf node within the hash tree maintained by the other peer, 4) receive the changed leaf node's value from the other peer, and then 5) update the identified leaf node's value to match the changed leaf node's value.

Figure 4:
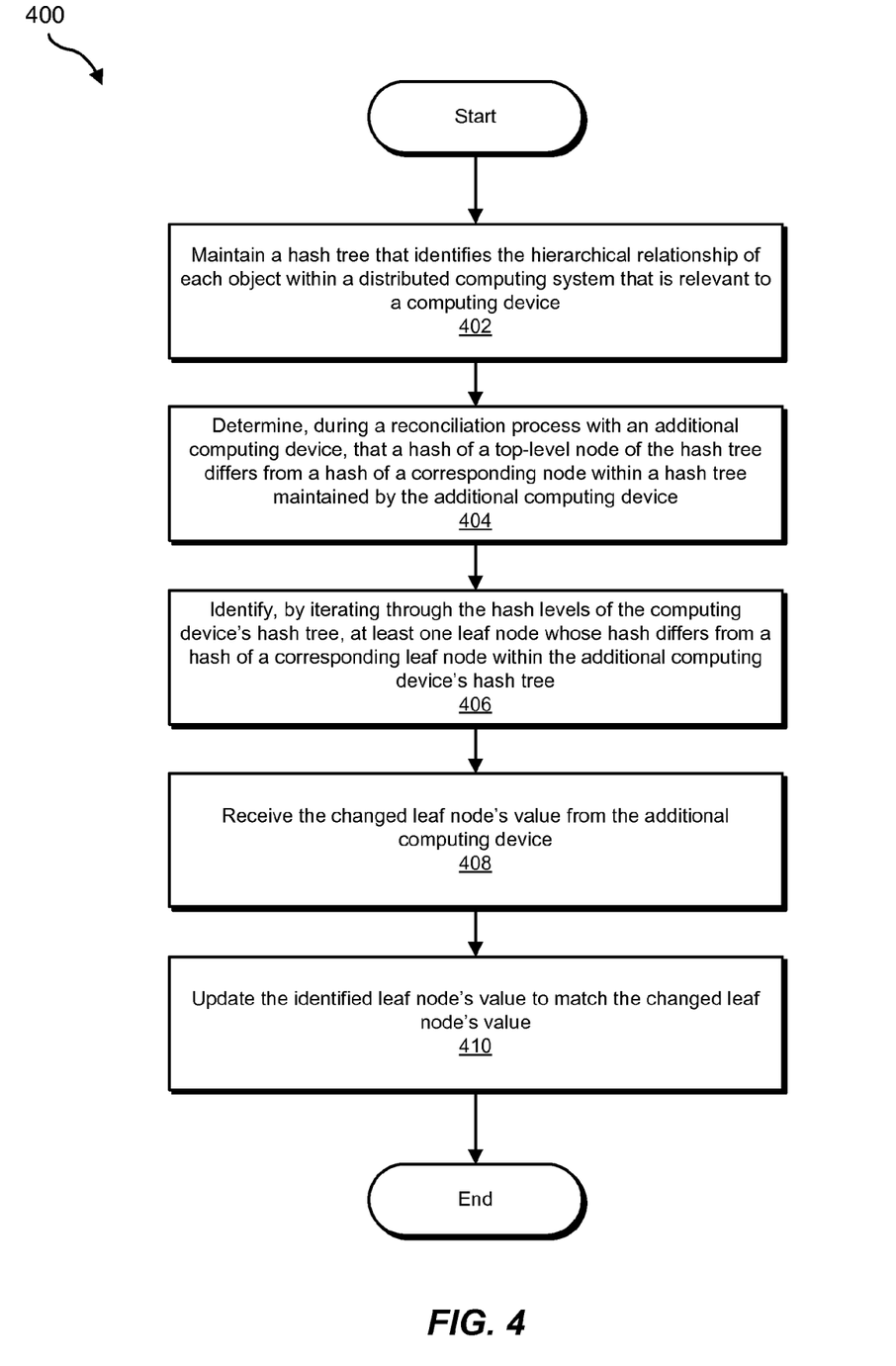
FIG. 4 is a flow diagram of an exemplary method for efficiently synchronizing configuration data within distributed computing systems.

FIG. 4 is a flow diagram of an exemplary computer-implemented method 400 for efficiently synchronizing configuration data within distributed computing systems. The steps shown in FIG. 4 may be performed by any suitable computer-executable code and/or computing system. In some embodiments, the steps shown in FIG. 4 may be performed by one or more of the components of system 100 in FIG. 1, system 200 in FIG. 2, system 300 in FIG. 3, computing system 610 in FIG. 6, and/or portions of exemplary network architecture 700 in FIG. 7.

As illustrated in FIG. 4, at step 402 a computing device may maintain a hash tree that is based on the hierarchical relationship of each object within a distributed computing system that is relevant to the computing device. For example, maintenance module 104 in FIG. 1 may, as part of client 202(1) in FIG. 2, maintain a hash tree (such as hash tree 122 in FIG. 5) that is based on the hierarchical relationship of each object within distributed computing system 200 that is relevant to client 202(1). Similarly, maintenance module 104 in FIG. 1 may, as part of peer 302(1) in FIG. 3, maintain a hash tree that is based on the hierarchical relationship of each object within distributed computing system 300 that is relevant to peer 302(1).

Figure 5:
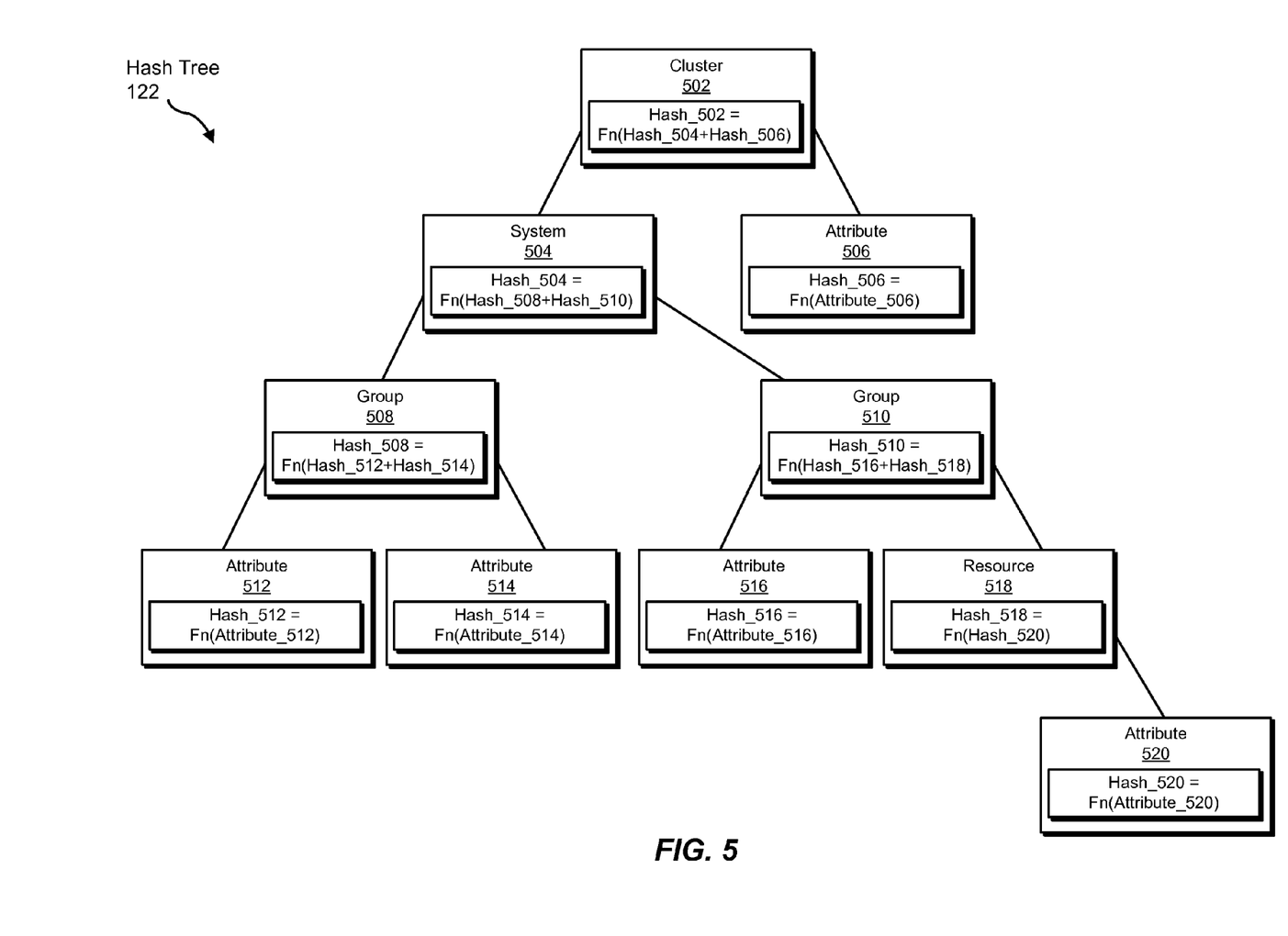
FIG. 5 is a block diagram of an exemplary hash tree containing configuration data for a device within a distributed computing system.

FIG. 5 is an illustration of an exemplary hash tree 122 that may be maintained by maintenance module 104. As illustrated in this figure, hash tree 122 may be based on the hierarchical relationships between objects within a distributed computing system. In this example, each node within hash tree 122 may represent an object within a distributed computing system and may be arranged based on known parent-child relationships. For example, cluster 502 may represent a parent of system 504, system 504 may represent a parent of groups 508 and 510, and so on. Examples of objects that may be represented within hash tree 122 include, without limitation, a cluster, system, group (e.g., an application group), resource (e.g., an application or volume), and/or attribute of one or more of the same.

In some examples, hash tree 122 may represent a subset of a hash tree maintained by an additional computing device. For example, a hash tree maintained by client 202(1) in FIG. 2 may represent a subset of a hash tree maintained by server 206 (which may maintain configuration data for all of distributed computing system 200). Alternatively, hash tree 122 may encompass the same scope as all other hash trees maintained by devices within the distributed computing system. For example, a hash tree maintained by peer 302(1) in FIG. 3 may reference the same objects as a hash tree maintained by peer 302(2).

In one example, maintenance module 104 may generate and/or maintain a hash for each node within hash tree 122. These hashes may then be stored, along with other configuration data (such as attribute data), with their associated nodes within hash tree 122. As will be explained in greater detail below, the computing device may use these hashes during a reconciliation process with an additional computing device to quickly and efficiently identify changes to its configuration data.

Maintenance module 104 may generate a hash for each node within hash tree 122 in a variety of ways. For example, if a node represents a leaf node (e.g., attribute 520 in FIG. 5), then maintenance module 104 may generate a hash for the leaf node by hashing the leaf node's value. For example, maintenance module 104 may generate a hash_520 for attribute 520 by hashing attribute 520. In contrast, if a node represents a non-leaf node (e.g., group 510), then maintenance module 104 may generate a hash for the non-leaf node by hashing the concatenated hashes of all of the non-leaf node's children. For example, maintenance module 104 may generate a hash_510 for group 510 by hashing the concatenated values of hash_516 and hash_518 (which, in turn, may represent a hash of hash_520).

In the above example, maintenance module 104 may maintain the hashes within hash tree 122 by recalculating a node's hash each time the node's value (in the case of leaf nodes) or the hashes one or more of the node's children (in the case of non-leaf nodes) changes. For example, if maintenance module 104 determines that the value of attribute 520 has changed, then maintenance module 104 may recalculate hash_520 using the new value of attribute 520. Maintenance module 104 may then iteratively recalculate the hash of each ancestor of attribute 520 until the hash of the top-level node within hash tree 122 (e.g., cluster 502) has been recalculated. For example, upon recalculating hash_520 using the new value of attribute 520, maintenance module 104 may: 1) recalculate hash_518 for resource 518 using recalculated hash_520, 2) recalculate hash_510 for group 510 using hash_516 and recalculated hash_518, 3) recalculate hash_504 for system 504 using hash_508 and recalculated hash_510, and then 4) recalculate hash_502 for cluster 502 using recalculated hash_504 and hash_506.

The systems described herein may generate or calculate hashes in a variety of ways using any of a variety of hash functions. For example, maintenance module 104 may generate or calculate hashes using, without limitation, SHA-1 hash functions, SHA-2 hash functions, MD5 hash functions, or the like. In one example, maintenance module 104 may generate or calculate each hash within hash tree 122 using the same hash function. For example, maintenance module 104 may calculate each hash within hash tree 122 using an SHA-1 hash function. Similarly, in some examples maintenance module 104 may generate or calculate hashes for hash tree 122 using the same hash function that is used by all other computing devices within the distributed computing system. For example, server 206 and clients 202(1)-(N) may each use an SHA-2 hash function when generating or calculating hashes.

In some examples, maintenance module 104 may attempt to reduce the probability of hash collisions within hash tree 122 by using differing hash functions when calculating leaf-node hashes and non-leaf-node hashes. For example, maintenance module 104 may use an SHA-1 hash function when generating hashes for leaf nodes within hash tree 122 but may use an MD5 hash function when generating hashes for non-leaf nodes.

Maintenance module 104 may also attempt to reduce the probability of hash collisions by using a hash-collision-detection function (such as a Bloom filter) to identify potential hash collisions. If maintenance module 104 identifies a potential hash collision, maintenance module 104 may then modify the hash of a problematic node implicated in the potential hash collision by, for example: 1) creating a null child node for the problematic node and then 2) recalculating the problematic node's hash. For example, if maintenance module 104 determines (using, e.g., Bloom-filter analysis) that hash_512 of attribute 512 may potentially clash with the hash of another node, then maintenance module 104 may create a null child node that depends upon attribute 512. Maintenance module 104 may then recalculate hash_512 by hashing the value of the null child node, resulting in a modification of hash_512.

In some examples, maintenance module 104 may attempt to avoid confusion that may result from the deletion of a node within a distributed computing system's hierarchy by accounting for and flagging deleted nodes. For example, if a server (such as server 206 in FIG. 2) removes one or more nodes (such as resource 518 and attribute 520) from its hash tree, then maintenance module 104 may mark or flag such nodes within the hash tree as having been deleted. For example, maintenance module 104 may replace the hash value of each deleted node with a predetermined value (e.g., "−1") that indicates that the node has been deleted. In this example, when a client (such as client 202(1)) subsequently requests and compares hashes within its hash tree with corresponding hashes of the server's hash tree (as explained in greater detail below), then the client may identify nodes that have been flagged or marked for deletion and remove the same from its hash tree. In some examples, maintenance module 104 may periodically purge or remove all nodes that have been flagged or marked as deleted.

Returning to FIG. 4, at step 404 the computing device may determine, during a reconciliation process with an additional computing device within the distributed computing system, that a hash of a top-level node of the hash tree differs from a hash of the corresponding node of a hash tree maintained by the additional computing device. For example, reconciliation module 106 in FIG. 1 may, as part of client 202(1) in FIG. 2, determine, during a reconciliation process with server 206, that a hash of the top-level node of hash tree 122 in FIG. 5 (e.g., hash_502 of cluster 502) differs from a hash of cluster 502 within a hash tree maintained by server 206. Similarly, reconciliation module 106 may, as part of peer 302(1) in FIG. 3, determine, during a reconciliation process with peer 302(2), that a hash of the top-level node of a hash tree maintained by peer 302(1) differs from a hash of the top-level node of a hash tree maintained by peer 302(2).

The phrase "reconciliation process," as used herein, may refer to any process within a distributed computing system during which one computing device within the distributed computing system exchanges configuration data with another computing device within the distributed computing system. Examples of times when reconciliation processes may occur include, without limitation, when a device reconnects to another device after a device failure and/or during device startup. For example, a reconciliation process may occur when a client (such as client 202(1) in FIG. 2) attempts to reconnect with a server (such as server 206 in FIG. 2) after failure in order to acquire at least a subset of the configuration data maintained by the server. Similarly, a reconciliation process may occur when a peer (such as peer 302(1) in FIG. 3) attempts to reconnect with another peer (such as peer 302(2)) within a peer-to-peer computing system after a failure.

The computing device may perform step 404 in a variety of ways. In one example, the computing device may perform step 404 by: 1) sending a request for a hash of the corresponding node to the additional computing device, 2) receiving a hash of the corresponding node from the additional computing device, and then 3) determining, by comparing the hash of the top-level node with the hash of the corresponding node, that the hash of the top-level node differs from the hash of the corresponding node. For example, reconciliation module 106 may, as part of client 202(1) in FIG. 2, send a request for a hash of cluster 502 to server 206 via network 204. In response to this request, server 206 may retrieve a hash of cluster 502 from its hash tree and then send the same to client 202(1). Upon receiving this hash, reconciliation module 106 may determine, by comparing the hash received from server 206 with its own hash of cluster 502 (e.g., hash_502) within hash tree 122, that the two hashes differ.

In another example, the computing device may perform step 404 by: 1) sending a hash of its top-level node to the additional computing device and then 2) receiving a communication from the additional computing device that indicates that the computing device's top-level hash differs from a corresponding hash maintained by the additional computing device. For example, reconciliation module 106 in FIG. 1 may, as part of peer 302(1) in FIG. 3, send a hash of its top-level node (e.g., hash_502 of cluster 502 in FIG. 5) to peer 302(2). Upon receiving this hash, peer 302(2) may determine, by comparing this hash with its own top-level hash (e.g., a hash of cluster 502 stored, e.g., within a hash tree maintained by peer 302(2)), that the two hashes differ. Peer 302(2) may then send a communication to peer 302(1) that indicates that the hash received from peer 302(1) differs from a corresponding hash maintained by peer 302(2).

Returning to FIG. 4, at step 406 the computing device may identify, by iterating through the hash levels of the computing device's hash tree, at least one leaf node within the computing device's hash tree whose hash differs from a hash of a corresponding leaf node within the additional computing device's hash tree that has changed subsequent to a prior reconciliation process. For example, reconciliation module 106 in FIG. 1 may, as part of client 202(1) in FIG. 2, identify, by iterating through the hash levels of hash tree 122 in FIG. 5, each leaf node within hash tree 122 whose hash differs from a hash of a corresponding leaf node within a hash tree maintained by server 206. Similarly, reconciliation module 106 may, as part of peer 302(1) FIG. 3, identify, by iterating through the hash levels of hash tree 122, each leaf node within hash tree 122 whose hash differs from a hash of a corresponding leaf node within a hash tree maintained by peer 302(2).

The computing device may perform step 406 in a variety of ways. In one example, the computing device may iteratively request and compare hashes from the additional computing device until at least one leaf node responsible for the mismatch identified in step 404 is detected. For example, upon determining (as part of client 202(1) in step 404) that the top-level hash of hash tree 122 (e.g., hash_502 in FIG. 5) differs from a hash of cluster 502 within a hash tree maintained by server 206, reconciliation module 106 may request hashes for all second-level nodes within hash tree 122 (e.g., hashes of system 504 and attribute 506) from server 206. Upon receiving the requested hashes from server 206, reconciliation module 106 may then compare the same with the hashes contained within hash tree 122 (e.g., hash_504 and hash_506). In this example, reconciliation module 106 may determine that the hash of attribute 506 received from server 206 is identical to hash_506 within hash tree 122 but that the hash of system 504 received from server 206 differs from hash_504.

Upon determining that the hash of system 504 received from server 206 differs from hash_504 in hash tree 122, reconciliation module 106 may request hashes for group 508 and group 510 from server 206. Upon receiving these hashes from server 206, reconciliation module 106 may determine, by comparing these hashes with the hashes contained within hash tree 122, that the hash of group 510 received from server 206 is identical to hash_510 in hash tree 122 but that the hash of group 508 received from server 206 differs from hash_508. As such, reconciliation module 106 may request hashes for attribute 512 and attribute 514 from server 206. Upon receiving the same, reconciliation module 106 may determine, by comparing these hashes with the hashes contained within hash tree 122, that the hash of attitude 514 received from server 206 is identical to hash_514 in hash tree 122 but that the hash of attribute 512 received from server 206 differs from hash_512. In this example, reconciliation module 106 may determine that attribute 512 has changed subsequent to a prior reconciliation process with server 206 and, as such, is responsible for the mismatch identified in step 404.

In another example, the computing device may perform step 406 by iteratively sending hashes of the nodes within its hash tree to the additional computing device in a level-by-level fashion until the additional computing device indicates that it has identified at least one leaf node that is responsible for the mismatch identified in step 404. For example, upon receiving (as part of peer 302(1) in step 404) a communication from peer 302(2) that indicates that the top-level hash of hash tree 122 (e.g., hash_502 in FIG. 5) differs from a hash of cluster 502 within a hash tree maintained by peer 302(2), reconciliation module 106 may send hashes of its second level nodes (e.g., hash_504 and hash_506) to peer 302(2). In this example, peer 302(1) may subsequently receive a communication from peer 302(2) that indicates that hash_504 is identical to a hash of system 504 maintained by peer 302(2). However, this communication may also indicate that hash_506 differs from a hash of attribute 506 maintained by peer 302(2), indicating that attribute 506 is responsible for the mismatch identified in step 404. In this example, the communication received from peer 302(2) may additionally include the changed value of attribute 506.

Returning to FIG. 4, at step 408 the computing device may receive the changed leaf node's value from the additional computing device. For example, reconciliation module 106 in FIG. 1 may, as part of client 202(1) in FIG. 2, receive the changed leaf node's value from server 206. Similarly, reconciliation module 106 may, as part of peer 302(1) in FIG. 3, receive the changed leaf node's value from peer 302(2).

The computing device may perform step 408 in a variety of ways. In one example, the computing device may receive the changed leaf node's value from the additional computing device in response to a request for the same (upon determining, e.g., that the leaf node in question has changed subsequent to a prior reconciliation process with the additional computing device, as detailed above). In other examples, the additional computing device may send the change leaf's node to the computing device sua sponte (upon determining, e.g., that the leaf node in question has changed subsequent to a prior reconciliation process with the computing device, as detailed above).

In one example, the computing device may receive the changed leaf node's value from the additional computing device as part of a snapshot that contains the changed leaf node's value. In this example, the snapshot may represent a subset of the configuration data maintained by the additional computing device. In this example, the computing device may have received a full snapshot of the additional computing device's configuration data during a prior reconciliation process with the additional computing device.

Returning to FIG. 4, at step 410 the computing device may update the identified leaf node's value to match the changed leaf node's value. For example, reconciliation module 106 in FIG. 1 may, as part of client 202(1) in FIG. 2, update (within hash tree 122 in FIG. 5) the value of the leaf node identified in step 406 so that it matches the changed leaf node's value received in step 408 from server 206. Similarly, reconciliation module 106 in FIG. 1 may, as part of peer 302(1) in FIG. 3, update (within hash tree 122 in FIG. 5) the value of the leaf node identified in step 406 so that it matches the changed leaf node's value received in step 408 from peer 302(2). Upon completion of step 410 in FIG. 4, exemplary method 400 may terminate.

In some examples, the computing device may recalculate both the hash of the updated leaf node and the hash of each ancestor of the updated leaf node until the hash of the top-level node within its hash tree has been recalculated. For example, upon updating the value of attribute 520 to match a value received server 206, maintenance module 104 may, as part of client 202(1) in FIG. 2, recalculate hash_520 for attribute 520 within hash tree 122 in FIG. 5. Maintenance module 104 may then iteratively recalculate the hash of each ancestor of attribute 520 until the hash of the top-level node within hash tree 122 (e.g., cluster 502) has been recalculated. For example, upon recalculating hash_520 using the new value of attribute 520, maintenance module 104 may: 1) recalculate hash_518 for resource 518 using recalculated hash_520, 2) recalculate hash_510 for group 510 using hash_516 and recalculated hash_518, 3) recalculate hash_504 for system 504 using hash_508 and recalculated hash_510, and then 4) recalculate hash_502 for cluster 502 using recalculated hash_504 and hash_506.

As detailed above, by building and maintaining a hash tree that is based on the hierarchical relationship of each relevant object within a distributed computing system, the systems and methods described herein may enable devices within the distributed computing system to quickly and efficiently identify configuration-data changes during a reconciliation process. In addition, by identifying and exchanging such changes, these systems and methods may enable devices within the distributed computing system to reduce the amount of data exchanged during reconciliation, potentially saving time and resources.

Figure 6:
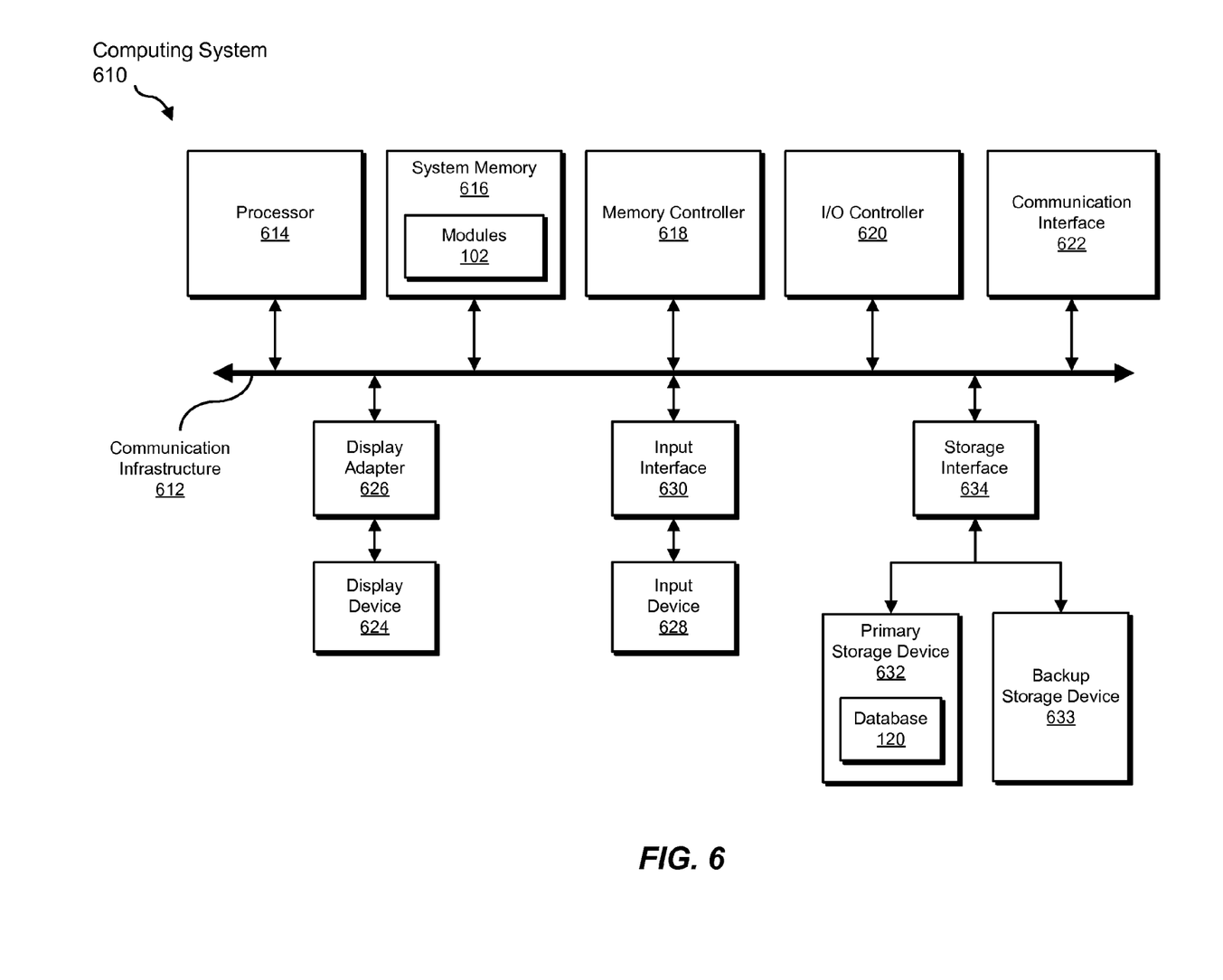
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the maintaining, reconciling, determining, identifying, iterating, receiving, updating, recalculating, using, flagging, purging, modifying, creating, and sending steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller 618 may perform and/or be a means for performing, either alone or in combination with other elements, one or more of the steps or features described and/or illustrated herein, such as maintaining, reconciling, determining, identifying, iterating, receiving, updating, recalculating, using, flagging, purging, modifying, creating, and sending.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the maintaining, reconciling, determining, identifying, iterating, receiving, updating, recalculating, using, flagging, purging, modifying, creating, and sending steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the maintaining, reconciling, determining, identifying, iterating, receiving, updating, recalculating, using, flagging, purging, modifying, creating, and sending steps disclosed herein. Communication interface 622 may also be used to perform and/or be a means for performing other steps and features set forth in the instant disclosure.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the maintaining, reconciling, determining, identifying, iterating, receiving, updating, recalculating, using, flagging, purging, modifying, creating, and sending steps disclosed herein. Input device 628 may also be used to perform and/or be a means for performing other steps and features set forth in the instant disclosure.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, storage devices 632 and 633 may be used, for example, to perform and/or be a means for performing, either alone or in combination with other elements, one or more of the maintaining, reconciling, determining, identifying, iterating, receiving, updating, recalculating, using, flagging, purging, modifying, creating, and sending steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
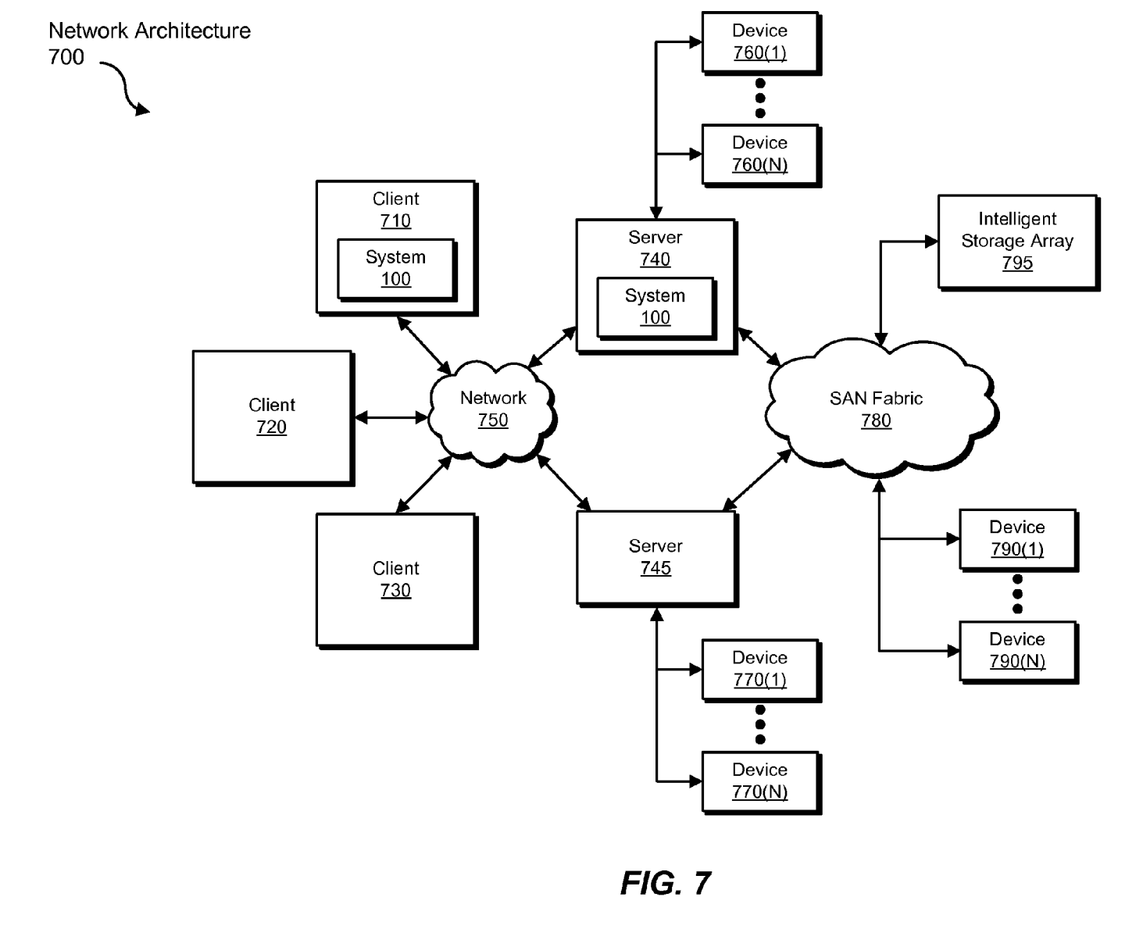
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6.

Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet. In one example, client systems 710, 720, and/or 730 and/or servers 740 and/or 745 may include system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790 (1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the maintaining, reconciling, determining, identifying, iterating, receiving, updating, recalculating, using, flagging, purging, modifying, creating, and sending steps disclosed herein. Network architecture 700 may also be used to perform and/or be a means for performing other steps and features set forth in the instant disclosure.

As detailed above, computing system 610 and/or one or more components of network architecture 700 may perform and/or be a means for performing, either alone or in combination with other elements, one or more steps of an exemplary method for efficiently synchronizing configuration data within distributed computing systems. In one example, such a method may include: 1) maintaining a hash tree that is based on the hierarchical relationship of each object within a distributed computing system that is relevant to the computing device, wherein the hash tree includes, for each leaf node within the hash tree, a hash of the leaf node's value and, for each non-leaf node within the hash tree, a hash of the concatenated hashes of all of the non-leaf node's children, 2) determining, during a reconciliation process with an additional computing device within the distributed computing system, that a hash of a top-level node of the hash tree differs from a hash of a corresponding node of a hash tree maintained by the additional computing device, 3) identifying, by iterating through the hash levels of the computing device's hash tree, at least one leaf node within the computing device's hash tree whose hash differs from a hash of a corresponding leaf node within the additional computing device's hash tree that has changed subsequent to a prior reconciliation process, 4) receiving the changed leaf node's value from the additional computing device, and then 5) updating the identified leaf node's value to match the changed leaf node's value.

In some examples, maintaining the computing device's hash tree may include: 1) determining that the value of at least one leaf node within the computing device's hash tree has changed, 2) recalculating the changed leaf node's hash, and then 3) iteratively recalculating the hash of each ancestor of the changed leaf node until the hash of the top-level node has been recalculated. In additional examples, maintaining the computing device's hash tree may include calculating hashes using the same hash function that is used by all other devices within the distributed computing system.

In some embodiments, maintaining the computing device's hash tree may include flagging nodes that have been deleted from the computing device's hash tree. In these embodiments, maintaining the computing device's hash tree may also include purging the flagged nodes from the computing device's hash tree.

In one example, maintaining the computing device's hash tree may include attempting to reduce the probability of hash collisions by: 1) using a hash-collision-detection function to identify potential hash collisions and then 2) modifying the hash of a problematic node implicated in a potential hash collision by creating a null child node for the problematic node and then recalculating the problematic node's hash. In additional examples, maintaining the computing device's hash tree may include using differing hash functions when calculating leaf-node hashes and non-leaf-node hashes in an attempt to reduce the probability of hash collisions.

In some examples, each node within the hash trees may represent an object within the distributed computing system. Examples of such objects include a system, a group, a resource, and an attribute.

In some embodiments, determining that the hash of the top-level node differs from the hash of the corresponding node may include: 1) sending a request for the hash of the corresponding node to the additional computing device, 2) receiving the hash of the corresponding node from the additional computing device, and then 3) determining, by comparing the hash of the top-level node with the hash of the corresponding node, that the hash of the top-level node differs from the hash of the corresponding node. In other embodiments, determining that the hash of the top-level node differs from the hash of the corresponding node may include: 1) sending the hash of the top-level node to the additional computing device and then 2) receiving a communication from the additional computing device that indicates that the hash of the top-level node differs from the hash of the corresponding node.

In some examples, receiving the changed leaf node's value from the additional computing device may include receiving a subset of the additional computing device's configuration data that contains the changed leaf node's value. In these examples, receiving a subset of the additional computing device's configuration data that contains the changed leaf node's value may include receiving a snapshot of a subset of the additional computing device's configuration data that contains the changed leaf node's value.

In one example, the computing device's hash tree may include a subset of the additional computing device's hash tree. In some examples, the computing device may represent a client and the additional computing device may represent a server. In other examples, the computing devices may represent peers within a peer-to-peer computing system.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, modules 102 from FIG. 1 may transform a property or characteristic of one or more of the devices illustrated in FIGS. 2 and 3 by enabling these devices to efficiently synchronize configuration data during a reconciliation process.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for efficiently synchronizing configuration data within distributed computing systems, at least a portion of the method being performed by a computing device comprising at least one processor, the method comprising:
   maintaining a hash tree that identifies the hierarchical structure of at least a portion of a distributed computing system, wherein the hash tree comprises:
      for each leaf node within the hash tree, a hash of the leaf node's value;
      for each non-leaf node within the hash tree, a hash of the concatenated hashes of all of the non-leaf node's children;
   identifying, during a reconciliation process with an additional computing device within the distributed computing system, at least one change to the hierarchical structure of the distributed computing system by:
      determining that a hash of a top-level node of the hash tree differs from a hash of a corresponding node of a hash tree maintained by the additional computing device;
      identifying, by iterating through the hash levels of the computing device's hash tree, at least one leaf node within the computing device's hash tree whose hash differs from a hash of a corresponding leaf node within the additional computing device's hash tree that has changed subsequent to a prior reconciliation process;
   receiving the changed leaf node's value from the additional computing device;
   updating the identified leaf node's value to match the changed leaf node's value.

2. The method of claim 1, wherein maintaining the computing device's hash tree comprises:
   determining that the value of at least one leaf node within the computing device's hash tree has changed;
   recalculating the changed leaf node's hash;
   iteratively recalculating the hash of each ancestor of the changed leaf node until the hash of the top-level node has been recalculated.

3. The method of claim 1, wherein maintaining the computing device's hash tree comprises calculating hashes using the same hash function that is used by all other devices within the distributed computing system.

4. The method of claim 1, wherein maintaining the computing device's hash tree comprises flagging nodes that have been deleted from the computing device's hash tree.

5. The method of claim 4, wherein maintaining the computing device's hash tree further comprises purging the flagged nodes from the computing device's hash tree.

6. The method of claim 1, wherein maintaining the computing device's hash tree comprises attempting to reduce the probability of hash collisions by:
   using a hash-collision-detection function to identify potential hash collisions;
   modifying the hash of a problematic node implicated in a potential hash collision by:
      creating a null child node for the problematic node;
      recalculating the problematic node's hash.

7. The method of claim 1, wherein maintaining the computing device's hash tree comprises using differing hash functions when calculating leaf-node hashes and non-leaf-node hashes in an attempt to reduce the probability of hash collisions.

8. The method of claim 1, wherein each node within the hash tree represents an object within the distributed computing system.

9. The method of claim 8, wherein the object comprises:
a system;
a group;
a resource;
an attribute.

10. The method of claim 1, wherein determining that the hash of the top-level node differs from the hash of the corresponding node comprises:
sending a request for the hash of the corresponding node to the additional computing device;
receiving the hash of the corresponding node from the additional computing device;
determining, by comparing the hash of the top-level node with the hash of the corresponding node, that the hash of the top-level node differs from the hash of the corresponding node.

11. The method of claim 1, wherein determining that the hash of the top-level node differs from the hash of the corresponding node comprises:
sending the hash of the top-level node to the additional computing device;
receiving a communication from the additional computing device that indicates that the hash of the top-level node differs from the hash of the corresponding node.

12. The method of claim 1, wherein receiving the changed leaf node's value from the additional computing device comprises receiving a subset of the additional computing device's configuration data that contains the changed leaf node's value.

13. The method of claim 12, wherein receiving the subset of the additional computing device's configuration data that contains the changed leaf node's value comprises receiving a snapshot of the subset of the additional computing device's configuration data that contains the changed leaf node's value.

14. The method of claim 1, wherein the computing device's hash tree comprises a subset of the additional computing device's hash tree.

15. The method of claim 1, wherein:
the computing device comprises a client and the additional computing device comprises a server;
the computing device and the additional computing device comprise peers within a peer-to-peer computing system.

16. A system for efficiently synchronizing configuration data within distributed computing systems, the system comprising:
a maintenance module programmed to maintain a hash tree for a computing device that identifies the hierarchical structure of at least a portion of a distributed computing system, wherein the hash tree comprises:
for each leaf node within the hash tree, a hash of the leaf node's value;
for each non-leaf node within the hash tree, a hash of the concatenated hashes of all of the non-leaf node's children;
a reconciliation module programmed to identify, during a reconciliation process with an additional computing device within the distributed computing system, at least one change to the hierarchical structure of the distributed computing system by:
determining that a hash of a top-level node of the hash tree differs from a hash of a corresponding node of a hash tree maintained by the additional computing device;
identifying, by iterating through the hash levels of the computing device's hash tree, at least one leaf node within the computing device's hash tree whose hash differs from a hash of a corresponding leaf node within the additional computing device's hash tree that has changed subsequent to a prior reconciliation process;
wherein the reconciliation module is further programmed to:
receive the changed leaf node's value from the additional computing device;
update the identified leaf node's value to match the changed leaf node's value;
at least one processor configured to execute the maintenance module and the reconciliation module.

17. The system of claim 16, wherein the maintenance module maintains the computing device's hash tree by:
determining that the value of at least one leaf node within the computing device's hash tree has changed;
recalculating the changed leaf node's hash;
iteratively recalculating the hash of each ancestor of the changed leaf node until the hash of the top-level node has been recalculated.

18. The system of claim 16, wherein the reconciliation module receives the changed leaf node's value from the additional computing device by receiving a subset of the additional computing device's configuration data that contains the changed leaf node's value.

19. The system of claim 16, wherein:
the computing device comprises a client and the additional computing device comprises a server;
the computing device and the additional computing device comprise peers within a peer-to-peer computing system.

20. A non-transitory computer-readable-storage medium comprising computer-executable instructions that, when executed by at least one processor of a computing device, cause the computing device to:
maintain a hash tree that identifies the hierarchical structure of at least a portion of a distributed computing system, wherein the hash tree comprises:
for each leaf node within the hash tree, a hash of the leaf node's value;
for each non-leaf node within the hash tree, a hash of the concatenated hashes of all of the non-leaf node's children;
identify, during a reconciliation process with an additional computing device within the distributed computing system, at least one change to the hierarchical structure of the distributed computing system by:
determining that a hash of a top-level node of the hash tree differs from a hash of a corresponding node of a hash tree maintained by the additional computing device;
identifying, by iterating through the hash levels of the computing device's hash tree, at least one leaf node within the computing device's hash tree whose hash differs from a hash of a corresponding leaf node within the additional computing device's hash tree that has changed subsequent to a prior reconciliation process;
receive the changed leaf node's value from the additional computing device;
update the identified leaf node's value to match the changed leaf node's value.

* * * * *